Dec. 3, 1935.                    C. W. LEGUILLON                    2,023,273
             METHOD AND APPARATUS FOR MAKING FIBROUS SHEET MATERIAL
                        Filed Aug. 23, 1932        4 Sheets-Sheet 1
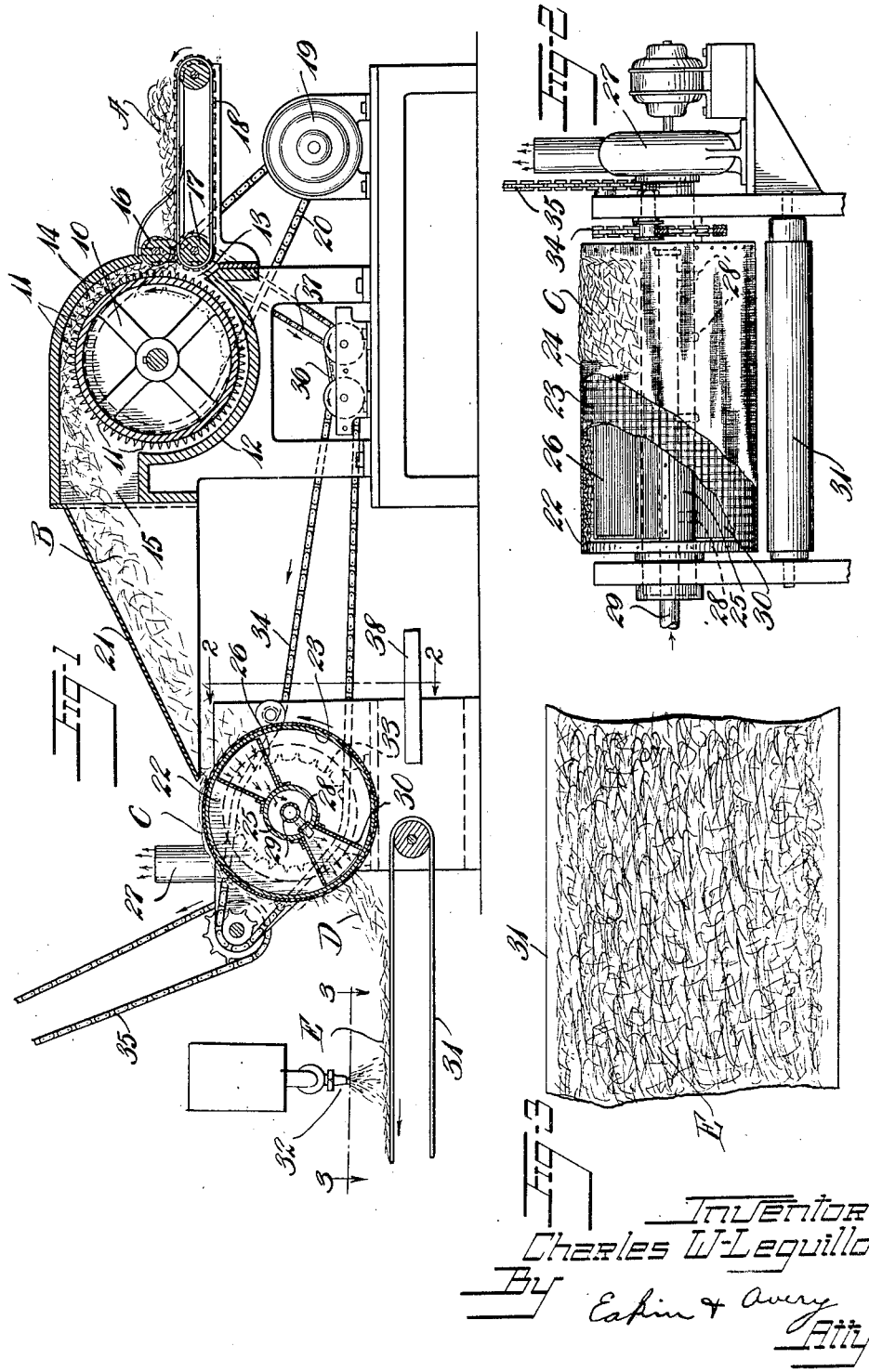
Inventor
Charles W. Leguillon
By Eakin & Avery
Attys.

Dec. 3, 1935.  C. W. LEGUILLON  2,023,273
METHOD AND APPARATUS FOR MAKING FIBROUS SHEET MATERIAL
Filed Aug. 23, 1932   4 Sheets-Sheet 2

Inventor
Charles W. Leguillon
By Eakin & Avery
Attys

Dec. 3, 1935.  C. W. LEGUILLON  2,023,273
METHOD AND APPARATUS FOR MAKING FIBROUS SHEET MATERIAL
Filed Aug. 23, 1932  4 Sheets-Sheet 3
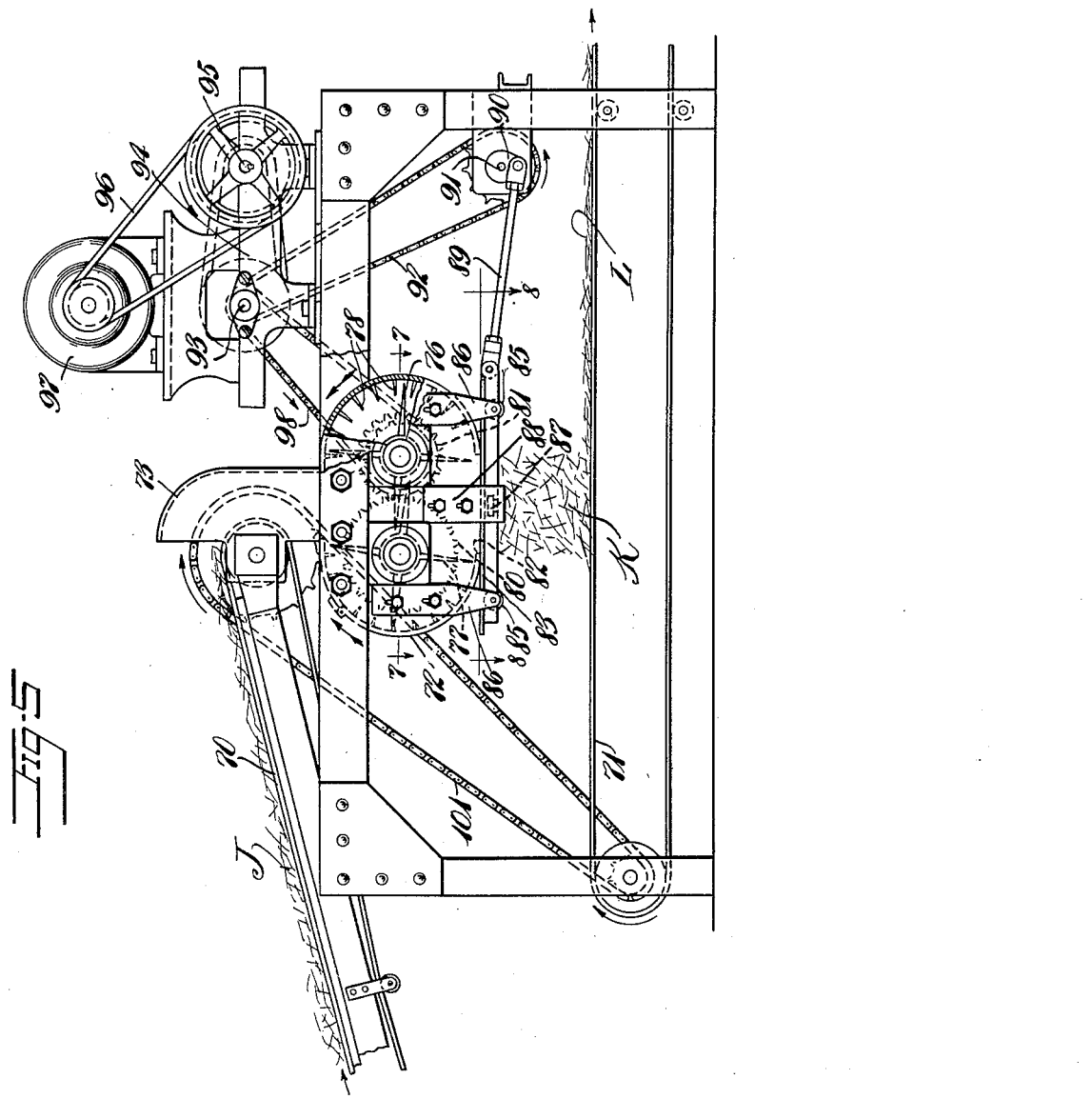
Inventor
Charles W. Leguillon
By Eakin & Avery
Attys.

Dec. 3, 1935.  C. W. LEGUILLON  2,023,273
METHOD AND APPARATUS FOR MAKING FIBROUS SHEET MATERIAL
Filed Aug. 23, 1932  4 Sheets-Sheet 4
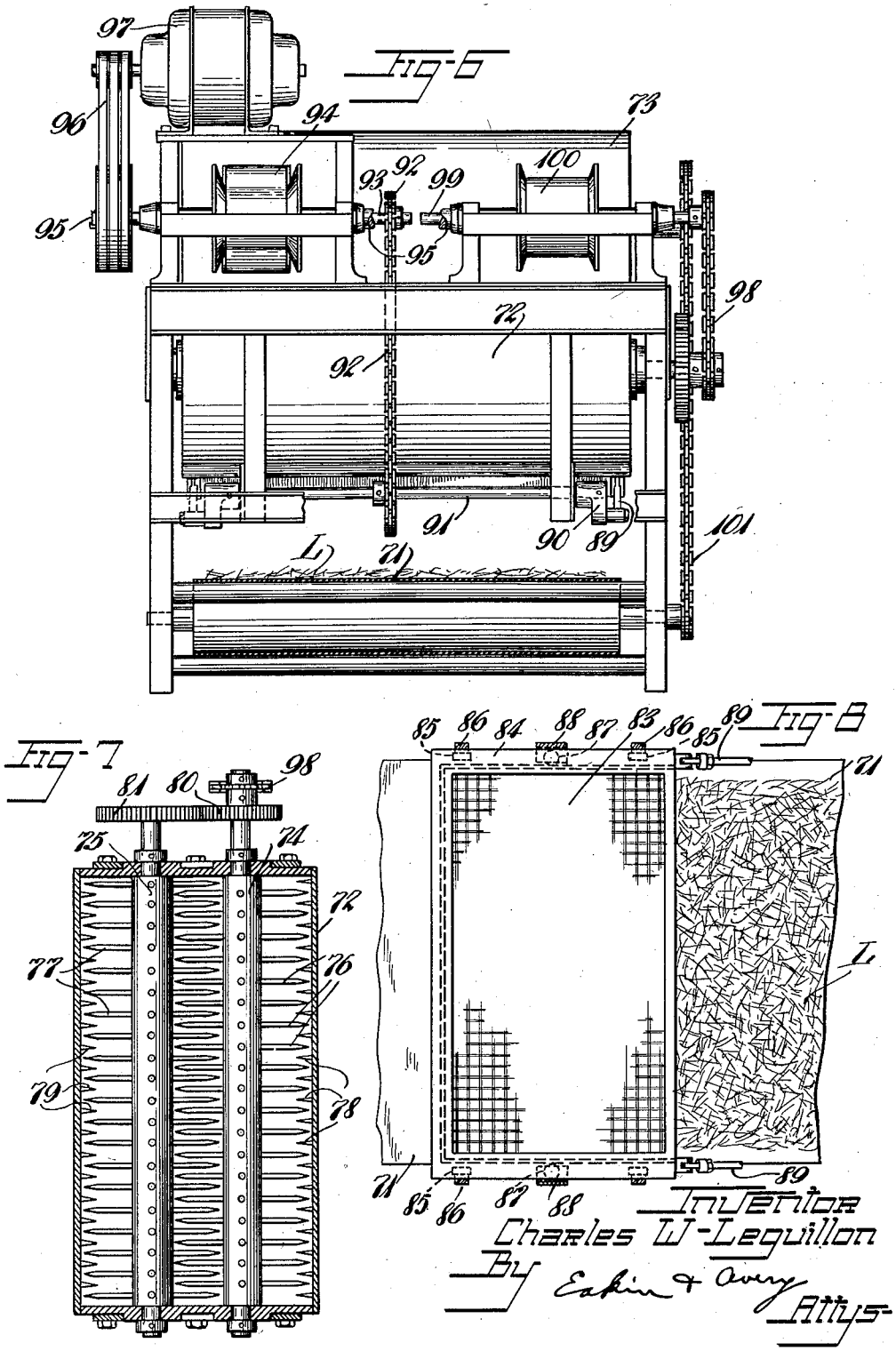

Patented Dec. 3, 1935

2,023,273

UNITED STATES PATENT OFFICE 2,023,273

METHOD AND APPARATUS FOR MAKING FIBROUS SHEET MATERIAL

Charles W. Leguillon, Akron, Ohio, assignor to The B. F. Goodrich Company, New York, N. Y., a corporation of New York Application August 23, 1932, Serial No. 630,002

4 Claims. (Cl. 154—33)

This invention relates to the manufacture of fibrous sheet material, especially sheet material of unwoven fibers held united at their crossing positions in reticulated sheet form, such material being especially useful in the manufacture of cushioning bodies, for example as is described and claimed in the copending application of Carl H. Heldenbrand, Serial No. 557,810, filed August 18, 1931 and entitled Cushioning bodies and method of producing the same.

The fibers of such material are preferably animal hairs and are preferably held united in the reticulated sheet form by resilient rubber composition.

The chief objects of this invention are to provide procedure and to provide apparatus for conveniently and efficiently disposing the unwoven fibers in the reticulated sheet form, to provide for arranging a large part of the fibers to extend in a generally longitudinal direction of the web, to provide for a high degree of uniformity of the fiber distribution throughout the web area, to provide conveniently for forming the web to the desired fiber density within a usefully wide range of limits, and to provide for removing foreign particles from the mass of fibers.

These and further objects will be apparent from the following description, reference being had to the accompanying drawings, in which:

Fig. 1 is a vertical section of apparatus constructed according to and embodying the invention in a preferred form.

Fig. 2 is a view taken along the line 2—2 of Fig. 1, parts being broken away.

Fig. 3 is a view taken along the line 3—3 of Fig. 1.

Fig. 5 is a side elevation of a further modified form of apparatus embodying the invention.

Fig. 6 is an end elevation of the apparatus of Fig. 5 as seen from the right.

Fig. 7 is a view taken along the line 7—7 of Fig. 5.

Fig. 8 is a view taken along the line 8—8 of Fig. 5.

Figure 4:
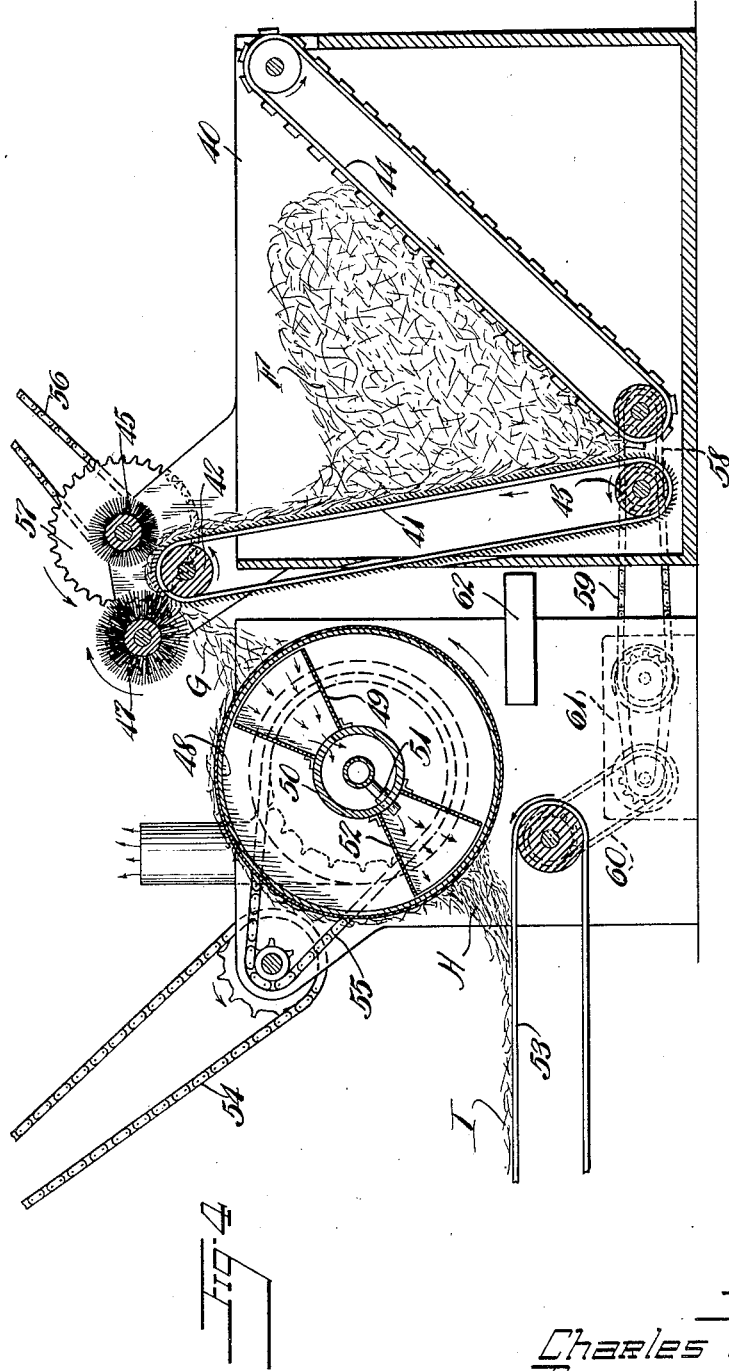
Fig. 4 is a side elevation in section of a modified form of apparatus embodying the invention.

With reference to the embodiment illustrated in Figs. 1 to 3, the apparatus in general comprises interrelated fiber-picking and transfer mechanism and web-forming mechanism constructed and arranged for operation by continuous process.

In a suitable supporting frame, as shown, a picking drum 10, having teeth 11, 11 projecting from its surface, is mounted for rotation on a horizontal axis within a casing 12 having a material receiving opening 13, a toothed picking portion 14, and a discharge passage 15. For feeding a supply mass A of the fibers into the opening 13 of the picker, a pair of gripper rolls 16, 17 is provided at the intake opening, the lower roll 17 preferably supporting and driving the conveyor belt 18 for feeding the fibers into the bight between the roll and the belt.

The belt 18 is preferably provided with markings spaced at regular intervals longitudinally of the belt to facilitate the placing by the operator of masses of fibers in an approximately uniform distribution upon the belt so that the fibers will be fed into the casing at substantially a constant rate. The fibers may be placed upon the belt in consecutive batches of substantially equal amounts and distributed with approximate uniformity over the consecutive equal areas indicated by the markings.

The drum 10 is revolved in the direction of the arrow of Fig. 1 by means of a motor 19 and sprocket chain connection 20 at a suitably high speed to pick apart the fibers fed into the casing and to eject the loose fibers in a stream B through the passage 15 of the casing, the arrangement being such that the teeth of the drum and the teeth of the casing are of sufficiently small radial spacing at their tips to effect the picking and ejection.

At the end of the discharge passage 15 there is provided a casing extension or hood 21 having its upper wall sloping downward to direct the stream B of the fibers obliquely downward onto a rising upper portion of the surface of a revolving drum 22, this drum being mounted preferably in a sufficiently spaced relation to the discharge passage 15 of casing 12 to permit the fibers to become well distributed in the stream before they reach the drum.

The wall of the drum 22 is perforate and in the illustrated embodiment comprises a supporting structure 23 of wire screen or other stiff perforate material having a surface covering 24 of fabric of a suitable small mesh to pass air but not the fibers and foreign particles other than minute dust.

Within the drum is disposed a non-rotatably mounted suction manifold 25, and an air conducting box 26 extending lengthwise of the drum and having its radially outward end open and disposed sufficiently close to the perforate wall 23 of the drum for air to be drawn through the latter over a peripherally limited extent in the direction of the stream of fibers. The manifold 25 is perforated at the inner end of the suction box 26, and for maintaining the air flow, a suction device 27 is provided exteriorly of the drum in connection with the manifold.

By this construction the fibers of the stream B are caused to be drawn onto the drum surface and held thereon in a layer C as the drum rotates, and inasmuch as the fibers are received upon a non-horizontal portion of the drum surface, relatively heavy foreign particles, such as bony parts that sometimes are found in masses of animal hair, are caused to fall and be thereby separated from the fibers, the force of the air suction being maintained at a degree insufficient to hold the heavier particles against the drum and at the same time sufficient to retain the fibers on the drum. The removal of some of the foreign particles may occur before the stream reaches the drum, the spacing of the picker and drum in a horizontal direction permitting this, which may be assisted also by their rebounding from contact with the hood 21. A suitable receptacle 38 may be provided to catch the dropped particles. Dust particles that are small enough to pass through the perforations of the drum wall are removed and withdrawn in that manner by the suction mechanism, and thus the mass of fibers is subjected to a cleaning operation which is desirable especially for the subsequent operation of uniting the fibers by the application of a flexible agglutinant.

The drum 22 is provided also with a fiber discharging device, comprising preferably a plurality of blower nozzles 28, 28 disposed within the drum to direct a flow of air against a lower portion of its perforate surface to force off in a stream D the fibers that have been deposited on the drum and deposit them upon a continuously moving surface which may be in the form of an endless belt 31.

For compactness of structure the nozzles 28, 28 are connected with an air supplying manifold 29 mounted within the suction manifold 25, the nozzles extending through the wall of the manifold 25. An air conducting box 30 is mounted upon the manifold 25 in air receiving relation to the nozzles 28, 28, and has an open outer end disposed close to the inner wall of the perforate drum to direct the air through the drum wall along its length and over a peripherally limited extent of the latter.

The fibers of the stream D are progressively deposited upon the surface of the moving conveyor 31 in a layer E of substantially uniform thickness and fiber distribution, the fibers being crossed with one another in approximately horizontal directions. By moving the conveyor belt 31 and rotating the drum 22 at the proper speeds, preferably so that their peripheral speeds are approximately equal, or slightly greater as regards the conveyor 31, and by maintaining the proper small degree of blower pressure sufficient only to force the fibers from the drum surface, a large majority of the fibers will be positioned to extend in a direction more nearly longitudinal with respect to the web than transversely thereof, while nevertheless being disposed in crossing relation, this arrangement of the fibers being especially desirable where the sheet is ultimately formed into cells so that a large part of the fibers will extend in the direction of curvature of the sheet for maximum strength.

This disposition of the fibers predominantly in a generally longitudinal direction of the web E apparently results from the fact that as the fibers carried on the drum come into the zone of the air blown through the drum, one end of each of most of the fibers comes under the influence of the discharging air before the other end of the fiber so that as the fiber leaves the drum it is caused by the current of air to extend more nearly in the direction of the flow, if it is not already nearly in that position. The generally longitudinal disposition of the fibers apparently results also from the fact that as the fibers are deposited upon the belt 31 the leading end of each fiber is drawn forward by its contact with the moving belt or with the fibers thereupon while the other end of the fiber is moving at a slower speed, and apparently the trailing end of the fiber is restrained somewhat by its contact with the other fiber of the stream, which action promotes the generally longitudinal disposition of the fibers.

For uniting the fibers of the layer E at their crossing positions to form the reticulated sheet, a flexible agglutinant, preferably rubber composition, may be applied, as by means of a suitable spraying device 32 depositing a liquid dispersion of the agglutinant upon the fibers as the layer is moved away from the fiber distributing mechanism by the belt 31.

The roller 17 of the feeding mechanism and the fiber distributing drum 22 are preferably driven together in variable timed relation so that the fiber density of the layer E can be regulated within close limits. For this purpose the drum 22 is provided with a sprocket 33 which is driven by a sprocket chain 34 that is connected with a suitable source of power (not shown) by means of a driving chain connection 35, the sprocket chain 34 being arranged also to drive the roller 17 of the feeding mechanism through a variable speed device 36 and a driving connection 37.

In operation, the roller 17 of the feeding mechanism and the fiber distributing drum 22 are set in motion in the direction indicated by the arrows in Fig. 1 by means of the interconnected driving mechanism above described, the picking drum 10 is rotated at the proper speed by the motor 19, and the conveyor 31 is moved at a constant speed by any suitable driving means (not shown). A mass of fibers A is then fed into the picking mechanism by means of the conveyor 18 and the rolls 16 and 17.

The fibers are supplied to the conveyor 18 preferably in small batches of substantially uniform weight, the batches being spread by the operator with approximate uniformity over consecutive equal areas of the belt, so that the fibers will be fed at a substantially uniform rate and not in bunches. The longitudinally spaced markings on the belt, previously described facilitate this operation.

On entering the casing the fibers are separated by the action of the toothed picker drum 10 and the loose fibers are forced in the stream B through the exit passage 15 of the picker casing 12 and downwardly in an oblique path through the hood 21 toward the perforate receiving drum 22. By means of the suction box 26 and the associated suction mechanism air is drawn through the perforate drum wall locally in the direction of the stream of fibers and the latter are thus caused to be deposited upon the surface of the drum in the layer C as the drum rotates.

While the fibers are drawn onto and held against the drum they are subjected to a cleaning operation. Relatively heavy foreign particles which may be present in the fiber supply mass are caused to drop and be separated from the fibers deposited upon the drum, the degree of suction being such as to draw and hold the fibers but not the heavier foreign particles against the sloping surface of the drum in the path of the stream B, the dust particles accompanying the fibers are drawn through the perforations of the drum wall and are removed by the suction mechanism.

The fibers of the layer C are carried upon the drum for a part revolution of the latter until they reach the zone of the blower box 30, where partly by gravity and partly by the flow of air from the nozzles 28, 28 through the box 30 and perforate drum wall, the fibers are caused to be progressively deposited in the layer E upon the moving conveyor belt 31. As heretofore explained, the fibers are caused to lie crossing one another in the layer E and extending predominantly in a generally longitudinal direction with respect to the web, and the web is formed with substantially uniform thickness and fiber density through its area.

While the fibers are thus arranged upon the conveyor belt, a flexible agglutinant is applied to them, as by means of the spray device 32, to unite the fibers at their crossing positions to form a reticulated sheet of sufficient tenacity to be further manipulated for further operations such as drying, further coating, shaping and vulcanization, for example as is described in the copending application, Serial No. 557,810, above referred to.

In the embodiment of Fig. 4 the apparatus comprises a hopper 40 for a supply mass F of the fibers. Within the hopper is disposed an endless belt 41 of card cloth or other flexible toothed structure partially supporting the mass of fibers and mounted upon upper and lower pulleys 42 and 43 respectively for movement of its fiber contacting reach in an upward direction to convey a layer of fibers out of the hopper. For facilitating engagement of the fibers with the belt 41 a second belt 44 is mounted in the hopper for movement of its fiber contacting reach obliquely downward toward the lower end of the lifting belt 41 to move the fibers in that direction. This belt may have a plain or cleated surface as desired.

At the upper end of the hopper, adjacent the lifting belt 41, is mounted a rotary brush 45 in such relation as to remove from the belt all but a layer of approximately uniform thickness and to return the surplus fibers to the hopper. The desired action of the brush 45 may be had by an arrangement such that the tips of the bristles are slightly spaced radially from the tips of the teeth of the belt, whereby the fibers protected by the teeth of the belt will not be removed by this brush.

The fibers remaining on the belt are carried partially around the pulley 42 and are removed by means of a second rotating brush 47 mounted in such relation that its bristles contact the surface of the belt to remove the fibers from between the teeth and force them away, the fibers by these manipulations being separated from one another. The brush 47 contacts the belt preferably at a position of the belt's curvature on the pulley before the latter has straightened into its return reach so that the fibers will be discharged in a stream G well away from the belt.

A perforate drum 48, similar in construction to the drum 22 of the embodiment of Fig. 1, is mounted in receiving relation to the stream G of fibers discharged by the brush 47, the drum 48 being provided at its interior with a stationary suction box 49 and suction manifold 50 for drawing the fibers onto the surface of the drum at the mouth of the suction box, and for causing relatively heavy particles to be separated from the fibers by gravity, and dust particles to be removed from the fibers by the suction mechanism, as in the first embodiment. A suitable receptacle 62 may be provided to catch the dropped particles. Also, as in the first embodiment, the drum is provided in its interior with a plurality of blower nozzles 51, directing air through a blower box 52 and the perforate drum wall at a position peripherally spaced from the suction box to discharge in a stream H the fibers that are carried upon the drum from the zone of the suction box to that of the discharge box. A moving conveyor belt 53 is positioned to receive upon it the discharged fibers in a layer I in which the fibers are distributed in crossed relation and predominantly in a general longitudinal direction of the layer with a high degree of uniformity of layer thickness and fiber density in a manner similar to that described for the first embodiment.

For driving the moving parts in their proper directions, as indicated by the arrows in Fig. 4, the drum 48 may be independently driven from a suitable source of power (not shown) by means of sprocket chain connections 54 and 55, and the remaining parts driven together from another source of power (not shown) by means of a sprocket chain connection 56 driving the brush 45, from which brush 47 and pulley 42 of the lifting belt 41 are driven by a gear connection 57, the belt 44 being driven from pulley 43 of the belt 41 by sprocket chain connection 58, and the conveyor belt 53 being driven from the pulley 43 by means of sprocket chain connections 59 and 60 through an interconnected variable speed device 61.

By properly regulating the relative speeds between the conveyor belt 53 and the other moving parts the layer I can be made of the desired fiber density within a usefully wide range of limits.

The fibers of the layer I are then united at their crossing positions to form the reticulated sheet, preferably by the application of a rubber composition, in a manner as described for the first embodiment.

In the embodiment of Figs. 5 to 8, a supply mass J of fibers is fed by a conveyor 70 and dumped into a picker mechanism comprising a casing 72 mounted in a suitable supporting frame as shown and having at its upper side a fiber receiving hopper 73 positioned at the end of the feeding conveyor 70, the lower end of the hopper opening into the casing 72. A pair of elongated picker members 74 and 75 each having series of radially projecting spikes 76, 77, respectively, are mounted within the casing for rotation about horizontal, parallel axes transverse to the conveyor belt 71, these picker members being disposed for passing movement of the spikes of one between the spikes of the other in axially overlapping relation for effective fiber picking. The inner side walls of the casing are preferably provided with a series of stationary spikes or teeth 78, 78 lying between the moving teeth 76, 77 for operation on fibers carried around by the rotating picker members.

The picker members are rotated in the opposite directions indicated by the arrows in Fig. 5, the two being driven together at different rotative speeds by means of meshing gears 80, 81 of unequal size for effectively picking the fibers apart and working them to the lower part of the casing.

The lower wall of the casing has an opening 75

82 and directly beneath this opening is mounted a horizontally reciprocable shaker screen 83 in such relation as to sift the separated fibers and distribute them in a stream K upon a moving conveyor belt 71 to form progressively a layer L of the fibers in crossed relation upon the latter.

The shaker screen is provided with a marginally flanged frame 84 and is supported at the flange of the frame for the reciprocatory movement upon rollers 85, 85 which are rotatably mounted on horizontal axes at the lower ends of vertical brackets 86, 86 secured to the casing. For laterally guiding the shaker screen, rollers 87, 87 are mounted on vertical axes at the lower ends of vertical brackets 88, 88 and engage the sides of the screen frame 84.

Pivoted to one end of the shaker screen frame are a pair of laterally spaced connecting rods 89, 89 which are connected at their other ends to cranks 90, 90 of a crank shaft 91. For operating the crank shaft and connecting rods to reciprocate the shaker screen a sprocket chain driving connection 92 is provided between the shaft 91 and a shaft 93, the latter of which extends only part way across the apparatus (Fig. 6), and is rotated by means of a variable speed drive 94 connected to a drive shaft 95 which is driven through a belt drive 96 by a motor 97.

The shafts of the rotatable and geared picker members 74 and 75 are rotated by means of a sprocket chain connection 98 from a shaft 99 which is axially aligned with the shaft 93 but rotatable independently thereof (Fig. 6) and is driven through a variable speed device 100 from the above-mentioned driving shaft 95.

The conveyor belts 70 and 71 are moved together by means of a sprocket chain connection 101 between the shafts of an end pulley of each, and these belts are driven by a suitable source of power (not shown).

In the operation of the embodiment of Figs. 5 to 8, the conveyors 70 and 71, the picker members 74 and 75, and the shaker screen 83 are set in motion by the mechanisms above described. A supply of fibers is then fed by the conveyor 70 into the hopper 73, the fibers being preferably arranged upon the conveyor by the operator in consecutive batches of substantially equal amounts, the batch being distributed with approximate uniformity over consecutive equal areas of the belt so that the fibers will be fed at a substantially constant rate. For facilitating this the belt 70 may be provided with markings spaced at uniform distances longitudinally of the belt to indicate to the operator the consecutive equal areas of the belt, in a manner similar to that described for the supply conveyor of the embodiment of Fig. 1.

The fibers pass through the hopper 73 into the casing 72 of the picker mechanism. Here the spikes of the rotating picker members 74 and 75 cooperate with each other and with the teeth 78, 79 of the casing to separate the fibers in the mass, the loose fibers being then deposited upon the shaker screen 83 and distributed in the stream K upon the conveyor 71, which moves beneath the screen, to form the layer L. The fibers are then united at their crossing positions by the application of a flexible agglutinant to provide a reticulated sheet in a manner as described for the first embodiment.

The picker members 74 and 75 being rotated, and the shaker screen 83 being reciprocated, from the driving shaft 95 through the respective independently controlled variable speed devices 98 and 92, the speeds of picking and shifting may be varied with relation to each other and with relation to the speeds of conveyors 70 and 71, and the rate at which the separated fibers are deposited upon the belt 71, and consequently the fiber density of the layer L, may be regulated as desired.

Variations may be made without departing from the scope of the invention as it is defined in the following claims.

I claim:

1. The method of making fibrous sheet material which comprises causing loose fibers to flow in a stream upon a supporting surface to deposit progressively a layer of the fibers thereupon while causing the fibers to lie in crossed relation and extending predominantly in the same plane and substantially in the general direction of the stream flow, and uniting the fibers of said layer at their crossing positions by a flexible agglutinant.

2. Apparatus for making fibrous sheet material comprising a perforate supporting surface, means for depositing loose fibers thereupon, means for blowing the fibers from said surface in a stream through an air space, a second supporting surface intercepting the flowing fibers, and means for causing such relative movement of the said second surface and the flowing fibers as to form progressively a deposited layer of the fibers upon the said second surface.

3. Apparatus for manipulating fibers comprising means for causing fibers to flow in a stream, a rotatably mounted drum having a wall pervious to air positioned in the path of said stream, suction means within the drum for drawing the fibers of said stream onto the drum surface, means within the drum for blowing air through its pervious wall at a position peripherally spaced from the fiber-receiving position to discharge the fibers in a second stream, a movable supporting surface positioned in fiber-receiving relation to the fibers of the second stream, and means for moving the last said surface to cause a layer of the fibers to be progressively deposited upon it.

4. Apparatus for making fibrous sheet material comprising a supporting surface, means for causing separated fibers to flow in a stream and to be progressively deposited therefrom in a layer upon said surface, and means included therein for causing the fibers to be disposed in said layer in crossing relation and extending predominantly in the same plane and substantially in the general direction of the stream flow.

CHARLES W. LEGUILLON.